Aug. 6, 1946.   H. B. HOLTHOUSE   2,405,143
HEATING SYSTEM
Filed Oct. 23, 1942            4 Sheets-Sheet 1
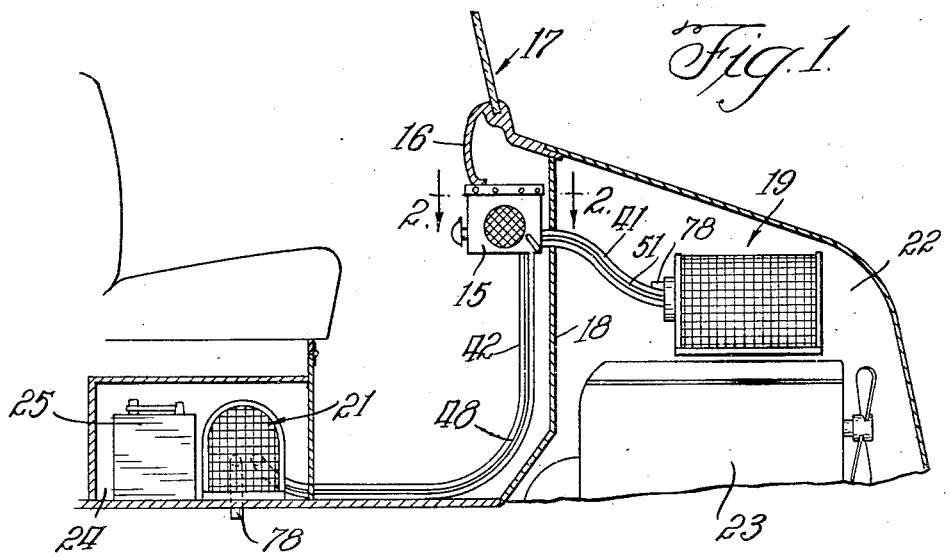
Fig. 1
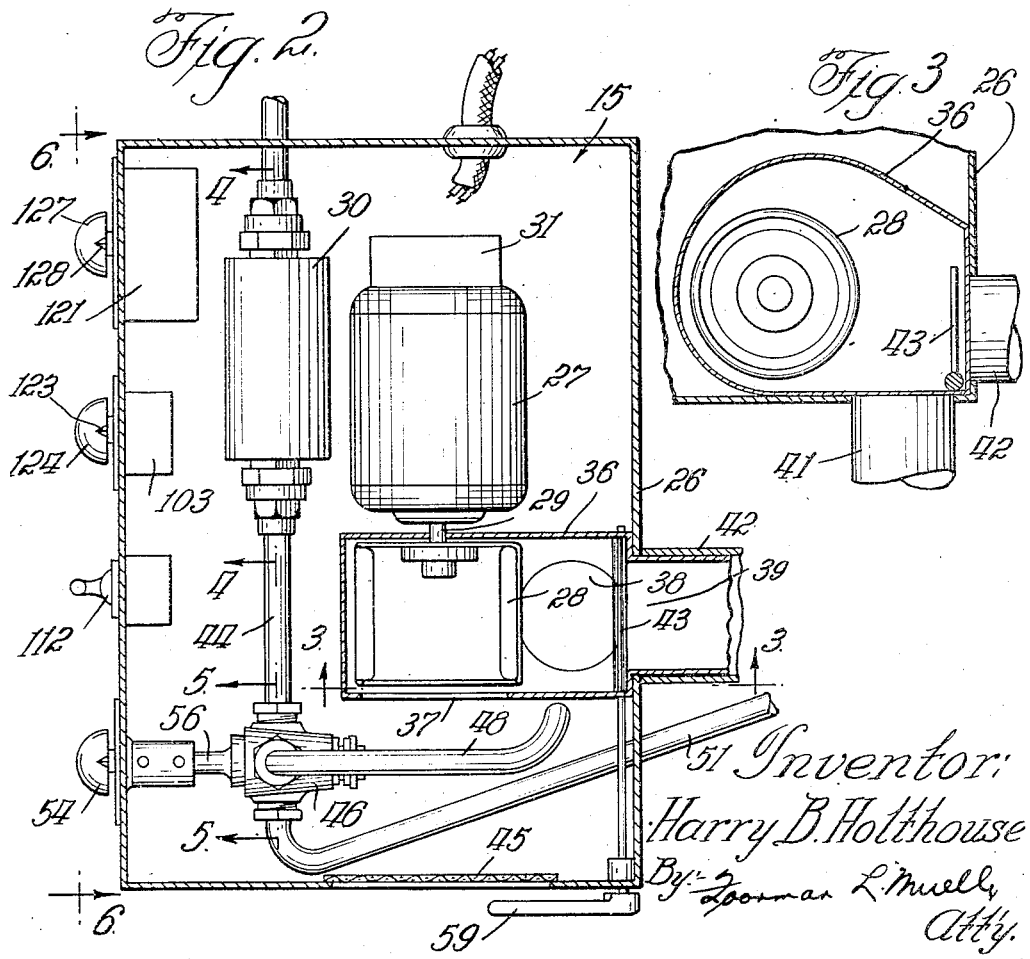
Fig. 2
Fig. 3
Inventor:
Harry B. Holthouse

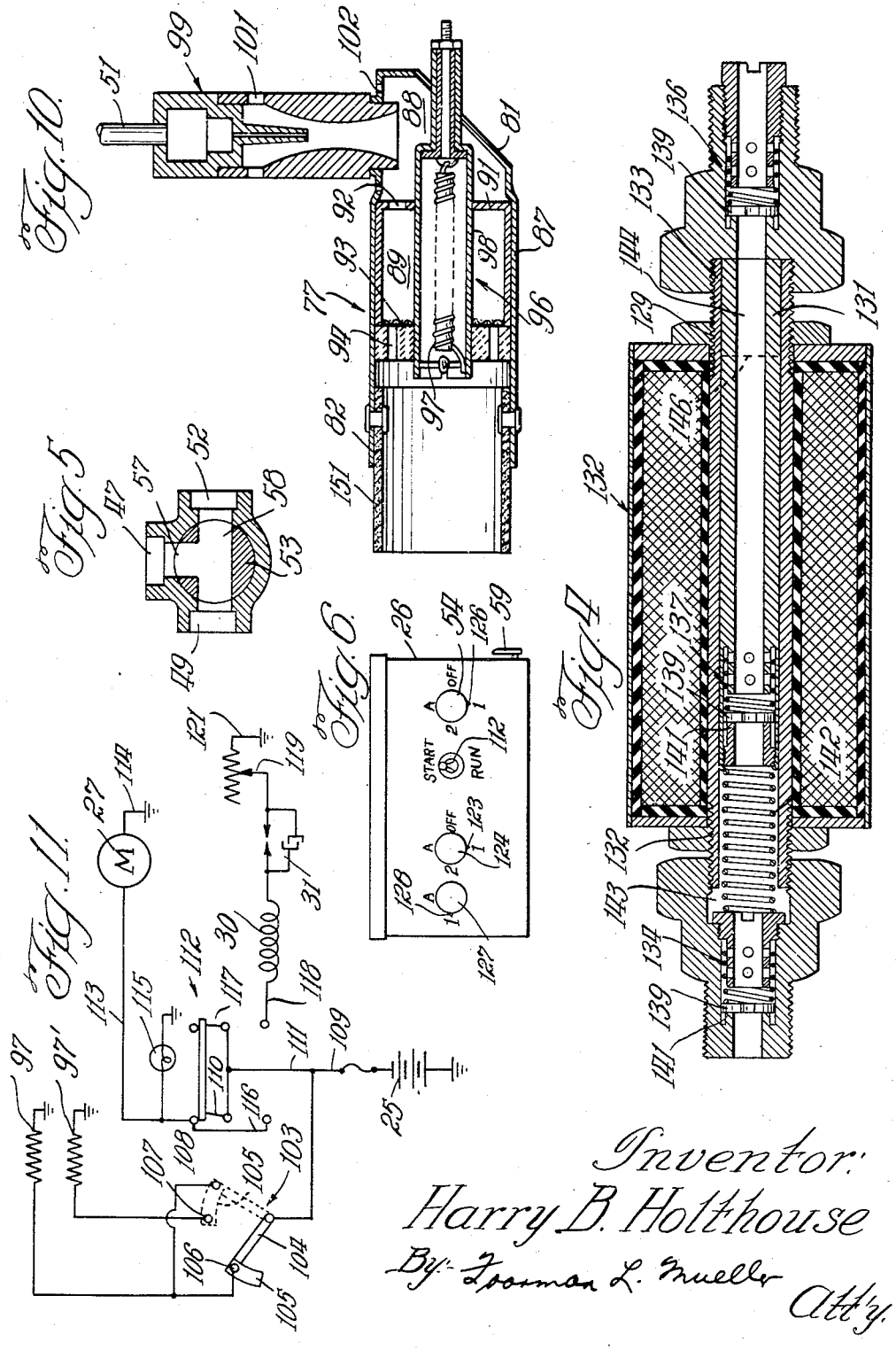

Aug. 6, 1946.  H. B. HOLTHOUSE  2,405,143
HEATING SYSTEM
Filed Oct. 23, 1942  4 Sheets-Sheet 3

Inventor:
Harry B. Holthouse
By: Toorman L. Mueller
Atty.

Aug. 6, 1946.  H. B. HOLTHOUSE  2,405,143
HEATING SYSTEM
Filed Oct. 23, 1942  4 Sheets-Sheet 4

Inventor:
Harry B. Holthouse
By Looman L. Mueller
Atty.

Patented Aug. 6, 1946

2,405,143

UNITED STATES PATENT OFFICE 2,405,143

HEATING SYSTEM

Harry B. Holthouse, Chicago, Ill., assignor to Galvin Manufacturing Corporation, Chicago, Ill., a corporation of Illinois Application October 23, 1942, Serial No. 463,108

15 Claims. (Cl. 180—90)

This invention relates generally to heating systems and in particular to a battery-operated heating system of internal combustion type which operates with a small amount of electrical energy to produce a relatively high heat output over a prolonged continuous period of time from a single storage battery of usual type.

Storage batteries now generally available commercially are rated at six, twelve, and twenty-four volts and are limited in their use as an effective source of electrical power supply over a continuous period, without being recharged, by their ampere-hour rating. This rating indicates for practical purposes, the life of the battery for continuous operation with a known amperage drain. As a result of the defined limits of the electrical energy supply of a battery, the length of time over which a battery-operated device, such as a battery-operated heater, can be continuously operated is dependent directly upon its power demands on the battery. Thus the higher the power demand of the heater the shorter will be its period of continuous operation. Although attempts have been made in the prior art to provide an electrical heater adapted for a prolonged continuous operation they have failed because of the many difficulties encountered in developing a heater capable of operating efficiently with but a small amount of electrical power. Further the heat output of the prior art heaters per unit of electrical power is very low so that they are relatively wasteful of the battery energy.

In those instance where the battery is employed for operation against heavy temporary loads, as in engine starting, any prolonged operation of a heater having a relatively high current demand would soon weaken the battery to a point where it would be incapable of turning the engine over. Since the effective capacity of a battery is reduced with cold temperatures the current drain thereon by the heater apparatus is proportionally increased, relative to such drain at a maximum effective capacity of the battery, whereby to accelerate the running down of the battery. A heater having a relatively high current demand is, therefore, entirely unsatisfactory for standby heating service for a mobile craft, or for any continuous heating requirement at cold temperatures.

Heaters of open-flame type, utilizing battery-operated ignition means are, of course, well known. Although the time over which these heaters may be continuously operated is determined essentially by their fuel supply rather than power supply, they burn with a considerable amount of smoke and soot and require frequent cleaning and attention which prevents their continuous operation over any great period of time. Further the open flame heaters are inefficient in operation and inconvenient to handle and transport, and also, because of a relatively low heat output, their application for heating purposes is appreciably restricted.

It is an object of this invention, therefore, to provide an improved electrically operated heater.

A further object of this invention is to provide a battery-operated heating system which is compact and simple in construction, and capable of producing a high heat output with a low current demand.

A still further object of this invention is to provide an electrical heating system having a combustion portion and a battery as a sole source of power supply, which is adapted to be operated continuously over a long period of time at maximum efficiency with a continuous drain on the battery of at least part of the electrical portions thereof.

Another object of this invention is to provide a portable battery-operated heater of internal combustion type.

Yet another object of this invention is to provide a heater for a power unit including an internal combustion engine and a starting battery therefore, which is adapted to be continuously operated from the battery over a relatively long period without impairing the function of the battery to later start the engine.

A further object of this invention is to provide a battery-operated heater including a heat generating unit of radiant type and of a compact construction to permit its being located directly in a space to be heated, even though such space may be relatively small.

A feature of this invention is found in the provision of a heater having a combustion portion for burning an air and fuel mixture, in which an electrically-operated fuel supply portion is adjustable to vary the burning characteristics of the air and fuel mixture.

A further feature of this invention is found in the provision of a heater having common air and fuel supply means for a plurality of combustion portions in which an electrically operated pump for the fuel is selectively adjustable to supply fuel in measured amounts for one or more of the combustion portions.

Further objects, features and advantages of this invention will become apparent from the following description when taken in connection with the accompanying drawings in which;

Fig. 1 illustrates the heating system of this invention as applied to the heating of the engine and battery compartments of a mobile craft;

Fig. 2 is a sectional view taken along the line 2—2 in Fig. 1 showing the relative arrangement of the air and fuel supply means in the control unit for the heating system;

Fig. 3 is a fragmentary sectional view taken along the line 3—3 in Fig. 2 showing an air distributing box for selectively directing combustion air to one or more combustion units associated with the control unit in Fig. 2;

Fig. 4 is a longitudinal sectional view of a solenoid pump as seen along the line 4—4 in Fig. 2;

Fig. 5 is a transverse sectional view along the line 5—5 in Fig. 2 showing a control valve for selectively directing fuel to be burned to the combustion units associated with the control unit of Fig. 2;

Fig. 6 is a front elevational view of the control unit as seen along the line 6—6 in Fig. 2;

Fig. 10 is a longitudinal sectional view showing in detail the construction of a fuel conditioning means associated with a combustion unit; and Fig. 11 illustrates diagrammatically a control circuit for the heating system of this invention.

Figure 7:
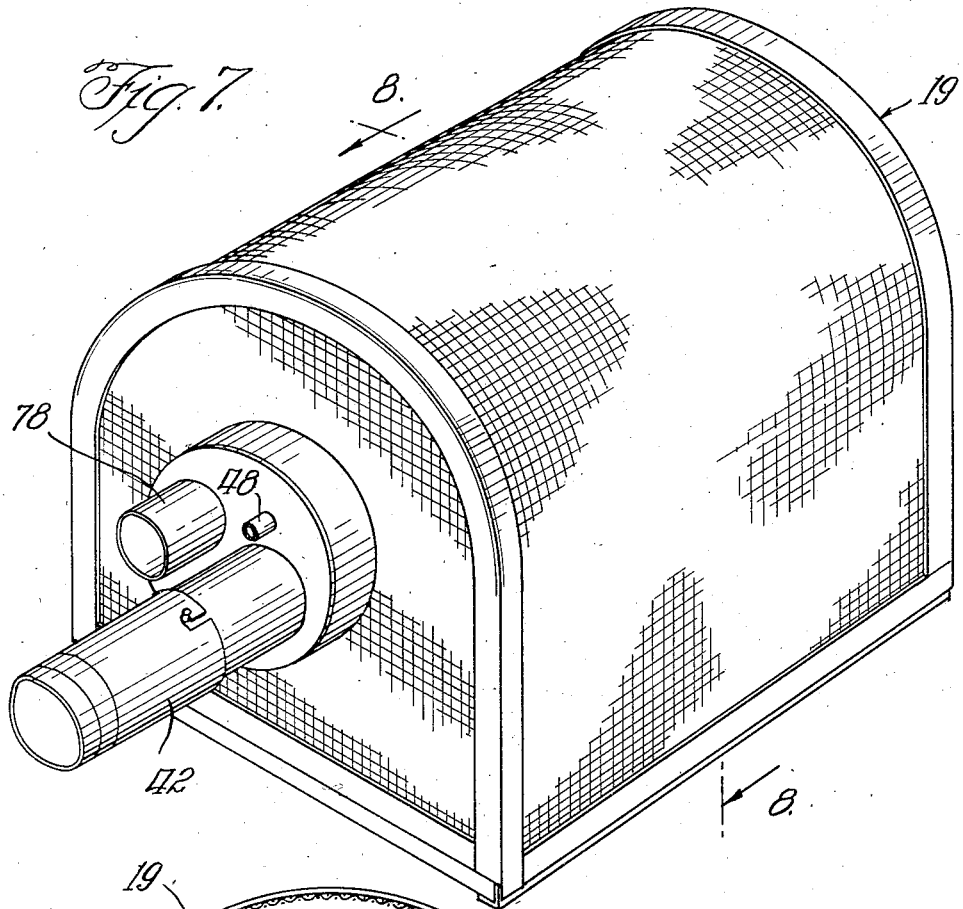
Fig. 7 is a front perspective view of a combustion unit adapted to have the heat generated therein radiated outwardly for heating purposes, with an open mesh construction of the housing or guard about the combustion portion being illustrated by crossed lines.

The heating system of this invention is illustrated in the drawings as applied to a mobile craft for operation as a stand-by heating apparatus for the engine and battery therefor. The engine of a mobile craft is difficult to start at cold temperatures of 0° F. and less due to the engine becoming stiff concurrently with a reduction, at cold temperatures, in the effective capacity in the engine starting battery. Since the effective capacity of the battery is reduced with cold temperatures, and the engine becomes more stiff with a lowering in temperature, a temperature is soon reached at which the battery is unable to crank or turn the engine over for starting purposes. In some instances this inability of the battery to turn the engine over occurs at about 20° below zero. Where a vehicle is standing idle under outside temperature conditions of this order it is readily understood that to facilitate a later starting thereof, its engine must be kept from cooling down to the outside temperature. By heating both the engine and the battery, the engine is prevented from cooling down to the outside temperature, while the effective capacity of the battery is simultaneously retained at a substantially maximum value. With the engine idle, the engine battery is the only power available for operating any heater apparatus and this power must be conserved since it is also the only power available for starting the engine. The heater of the present invention operates, after combustion has been started, with a low current demand on its associated battery so as to be capable of operating for many hours without reducing the effective capacity of the battery below a satisfactory engine starting value. Further, when the effective capacity of the battery is at a low value, the heater may be operated with full efficiency, continuously over a relatively long period of time without immediately running the battery down. A positive and reliable operation of the heating system is thus assured under all weather conditions and for a relatively long continuous period of operation.

Although the battery-operated heater of this invention is illustrated with a mobile craft it is to be understood that it is not to be so limited in its application and that it may be used as a portable heating unit in army field work, by outdoor sportsmen, for space heating in an automobile or trailer, and for any heating purpose requiring a compact, light weight heater of low battery drain and relative high heat output.

As shown in Fig. 1 the present invention includes a control unit 15 carried on the dashboard 16 of a vehicle 17 and to the operator's side of a fire wall 18. The control unit is operatively connected with like combustion units 19 and 21, one of which is located in a compartment 22 for the vehicle engine 23, while the other is located in a compartment 24 for the engine battery 25.

The control unit 15 (Figs. 2 and 3) includes a housing 26 of substantially rectangular shape for a motor 27 having a blower 28 carried at one end of the shaft 29 thereof. A fuel pump 30, of solenoid type, is arranged in a substantially parallel relation with the motor and blower for a side by side assembly. Associated with the end of the motor shaft 29 opposite from the blower 28 is a breaker assembly 31 arranged in the circuit of the pump 30 to operate the same, as will be later explained.

The blower 28 is of sirroco type and is provided with a scroll or casing 36 positioned within the housing 26 and having an inlet opening 37 and a pair of outlet openings 38 and 39, with the outlets being connected with flexible conduits 41 and 42, respectively, for the corresponding combustion units 19 and 21, respectively. The outlet openings 38 and 39 are positioned substantially normal to each other with the air flow therethrough being controlled by a butterfly valve 43 in a manner which is believed to be obvious. Air is admitted into the housing 26 to the scroll inlet 37 through an opening 45.

The pump 30 has a discharge line 44 with a three way valve unit 46 (Figs. 2 and 5) connected thereto for selectively directing fuel to either one, or both, of the combustion units 19 and 21, or for stopping the supply of fuel thereto. The valve outlet 47 is connected with the combustion unit 21 through a fuel line 48 while the valve outlet 49 is connected with the combustion unit 19 by a fuel line 51. The valve inlet 52 is arranged opposite the outlet 49, and is connected with the pump discharge pipe 44. A rotary valve member 53 in the valve unit 46 is formed with connected passages 57 and 58 arranged normal to each other and moved on rotation of the member 53 into selective communication with the inlet 52, and outlets 47 and 49. Rotation of the member 53 is accomplished through a control knob 54 on the outside of the casing 26 connected to the member 53 by a shaft 56. The hand lever 59 for operating the air valve 43 is also located to the outside of the casing 26 so that the setting of the control unit 15 for operating either one or both of the combustion units 19 and 21 is readily accomplished by a simple manipulation of the control knob 54 and lever 59.

Figure 8:
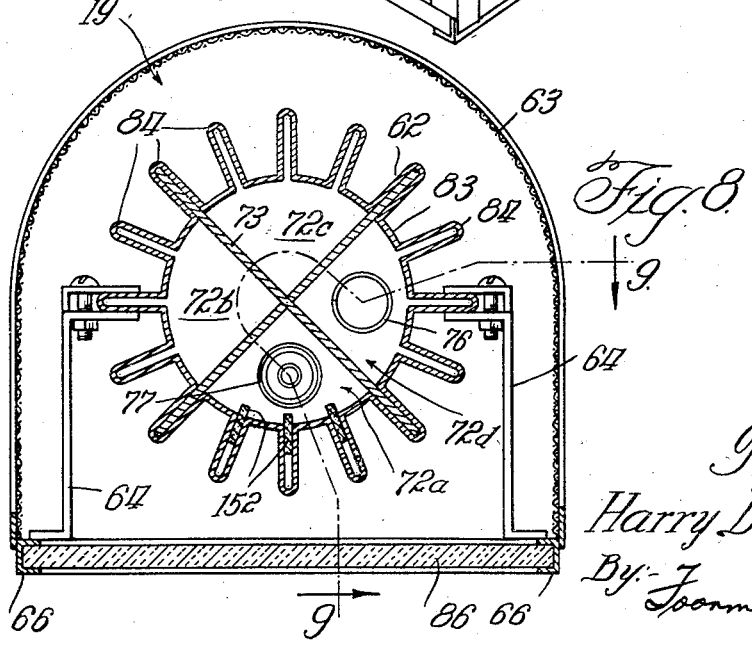
Fig. 8 is a transverse sectional view of a combustion unit as seen along the line 8—8 in Fig. 7.
Figure 9:
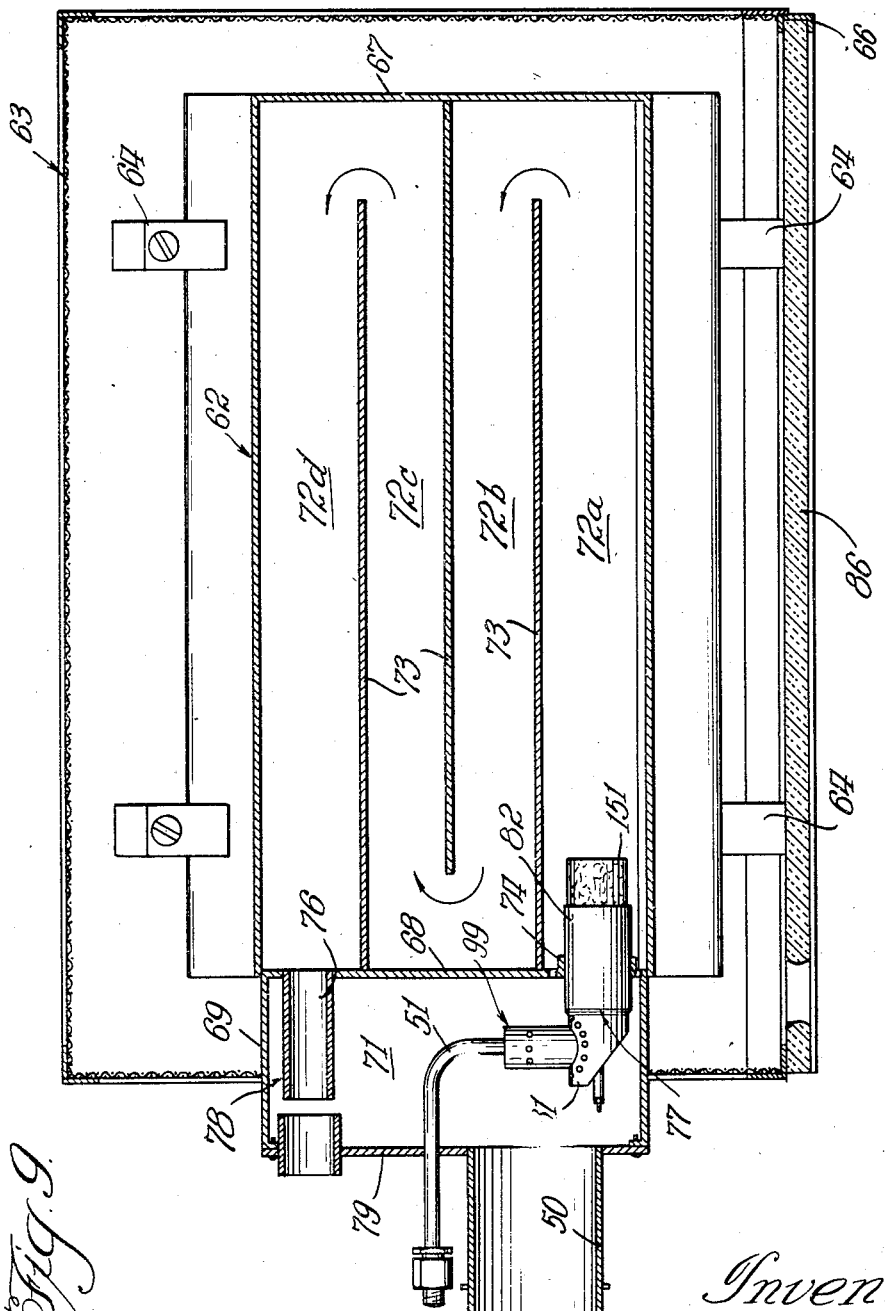
Fig. 9 is a sectional developed view of a combustion unit as seen along the line 9—9 in Fig. 8.

Since the combustion units 19 and 21 are of like construction only the unit 19 will be referred to in the following detailed description. With reference to Figs. 7, 8 and 9 the combustion unit 19 is seen to include a combustion chamber 62 supported within an open mesh housing or guard structure 63 by upright supporting brackets 64 which in turn are carried on channel base members 66. The combustion chamber 62, which is shown in development in Fig. 9, is of a substantially cylindrical shape closed at one end by a cover plate 67 and at its opposite end by the bottom 68 of a substantially cup-shaped member 69. The member 69 defines in part an air supply chamber 71 which is in axial alignment with the combustion chamber 62. The combustion chamber 62 is divided longitudinally thereof into four axially extending but connected passages 72a—72d by a partition member 73 of substantially X-shape. The combustion chamber inlet 74 and outlet 76 are formed in the bottom portion 68 of the cup member 69 in communication with the passages 72a and 72d, respectively. Located within the inlet 74 is an air and fuel conditioning means, indicated generally as 77. The outlet 76 is provided with a tail or exhaust pipe assembly 78 extended into the air supply chamber 71 and then outwardly therefrom through an end plate or cover 79 for the air chamber 71.

The outer wall or body portion of the combustion chamber 62 (Fig. 8) is integrally formed with alternately arranged peripheral portions 83 and double fin portions 84, which are angularly spaced about the combustion chamber and extended axially thereof. The side portions of the partition member 73 are located within the inner open ends of certain ones of the fins 84 and retained therein in a fixed position relative to the combustion chamber body portion by welding or like means. The brackets 64, previously mentioned, are clamped about certain other of the fins 84 as is clearly indicated in Fig. 8. The adjacent sides of a fin element at the inner open end thereof are relatively close together so as to form a slit-like opening for the fin element; this opening being shown enlarged in the drawings for the purpose of clarity. On operation of the combustion chamber 62 the heat generated is radiated outwardly from the fins 84 and through the perforated housing structure 63 into the space to be heated. The mesh construction of the housing is such as to freely permit air to be passed therethrough, and functions as a guard for the combustion chamber 62. In those instances where it is not desirable to have the heat radiated directly against the supporting structure for the combustion unit 19, an insulating shield or bottom 86 is adapted to be removably inserted within the channel-shaped frame members 66. With the insulating member 86 in place, therefore, heat is radiated substantially only from the sides and top of the combustion chamber 62, with the removal of the insulating plate 86 providing for the radiation of the heat in all directions from about the combustion chamber.

As is readily apparent from the developed view of the combustion chamber 62 in Fig. 9 the combustion chamber is not limited to a cylindrical shape but may be readily constructed in a flat rectangular form to provide for its direct mounting on a surface to heat the same by conduction and radiation. Thus for example in the heating of internal combustion engines a flat combustion chamber can be easily secured to the oil pan or intake manifold, or located on one thereof to heat the same by conduction while heating the other part by radiation, with the radiation of heat being facilitated by suitable shields or the like for directing the heat to such other part.

The air and fuel mixing means 77, which was explained above as being located in the inlet 74 of the combustion chamber 62, includes a substantially tubular shaped housing member 87 having a substantially closed end portion 81 within the air supply chamber 71 and an open end portion 82 extended within the combustion passage 72a (Figs. 9 and 10). A mixing chamber 88, located at the closed end 81, is separated from an equalizing chamber 89 by a heat conducting plate 91 having perforations 92 therein. The equalizing chamber 89 in turn is both defined and separated from the combustion chamber passage 72a by a heat insulating plate 93 having perforations 94 therein. Extended substantially axially through the casing 87 is a combination heating and igniting unit 96 including a resistance coil 97 supported in a spaced relation within a heat conducting tube 98 composed of copper or like material. The casing 87 and partition plate 91 are also provided in a heat conducting material such as copper or the like and are in thermal connection with the combination unit 96 so as to readily receive heat therefrom. The combination unit 96 is adapted to heat the air and fuel mixing means 77 to at least a fuel vaporizing temperature to vaporize the fuel supplied thereto by the pump 30 for mixing together with the combustion air supplied by the blower 28, and to ignite such mixture for burning within the combustion chamber 62.

The fuel line 51 from the pump 30 is connected to an injection nozzle 99 supported on the casing 87 at the mixing chamber 88 and located within the air supply chamber 71. The air conduit 41 from the blower 28 is connected with a nipple 50 on the cover 79 for the air supply chamber 71 as by a bayonet slot connection. A portion of the air from the air chamber 71 enters the nozzle 99 through ports 101 therein and travels with the fuel in the nozzle 99 into the mixing chamber. Further air is admitted directly into the mixing chamber 88 from the air supply chamber 71, through apertures 102 in the casing 87 and about the fuel nozzle 99. The fuel entering the mixing chamber is heated to at least a fuel vaporizing temperature by the heating unit 96 for intimate mixing with the air in such chamber, the heat from the heating unit being transferred to the casing 87 and plate 91 in thermal connection therewith. This mixing is facilitated by the turbulence of the air in the mixing chamber as produced by the blower 28. The mixture thus produced passes into the equalizing chamber 89 through the apertures 92 in the plate 91, the equalizing chamber in conjunction with the insulating plate 93 functioning to retard the mixture flow through the conditioning unit 77 to reduce the turbulence of the mixture and to disperse the same substantially uniformally across the entire open end 82 of the casing 87. A mixture of substantially uniform fuel characteristics is thus provided at the outlet 82 for ignition by the combination unit 96 which functions as a heat gun. In other words the heat developed by the coil 97 is projected outwardly from the copper tube 98, with the heat generated being dependent upon the watt input to the resistance coil 97. The mixture thus ignited is burned in the combustion chamber 62, with the exhaust gases being discharged through the pipe assembly 78.

In describing the operation of the heating system reference is made to the circuit diagram in Fig. 11. Although the coils 97 in each conditioning means 77 are of the same construction, for clarity of description, the coil corresponding to the combustion unit 19 will be designated by the numeral 97'. Each coil 97 and 97' is connected in series with the battery 25 and a control switch 103, and in parallel relative to each other. The switch 103 includes a switch arm 104 movable in a clock-wise direction as viewed in Fig. 11 to progressively engage a sliding contact 105 thereon with terminals 106, 107 and 108. The terminals 106 and 108 are in the circuit of the coil 97, while the terminal 107 is in the circuit of the coil 97'. The terminals 106 and 107 are spaced a distance apart greater than the distance between the terminals 107 and 108 so that the sliding contact 105 can be separately positioned on the terminals 106 and 107 to selectively close the circuits for the heating coils 97 and 97'. A separate energization of the coils 97 and 97' is thus accomplished by a continuous movement of the contact arm 104 in a clockwise direction. However the contact 105 is of a greater arcuate length than the distance between the terminals 107 and 108 so as to be capable of simultaneously closing the circuits for the heating coils 97 and 97' when the operation of both combustion units 19 and 21 is desired. The coils 97 and 97' may thus be energized alone or together.

The circuit for the motor 27 from the battery 25 includes for heater starting conductors 109 and 111, contact arm 110 of a double pole double throw control switch 112, conductor 113, the motor 27 and a ground connection 114. The circuit of the motor 27 for normal heater operation includes from the contact arm 110, a conductor 116 connected with conductor 113, the remainder of the motor circuit being the same as for heater starting. A light 115 connected from conductor 113 to ground visually indicates a closed position of the switch 112. The circuit for the pump 30 for normal heater operation is common with that of the motor 27 up through the conductor 111 and includes further contact arm 117 of switch 112, conductor 118, the pump 30, the circuit breaker 31, a rheostat 119, and a ground connection 121. The switch 103 thus functions to control only the operation of the coils 97 and 97', while the switch 112 in one position closes only the circuit for the motor 27 and in its other position the circuits for both the motor 27 and the pump 30. This action of the double throw switch 112 permits for only the motor 27 and a coil 97 and 97' being operated when the heater is started to assure an initial burning up of any residual fuel in the heater prior to the admission of additional or new fuel. Also a coil 97 and 97' may be heated to an optimum temperature before any fuel is fed to the heater for burning to assure a complete vaporizing and efficient burning of the first fuel admitted for burning. At the end of heater operation the switch 112, when moved into the heater starting position stops the operation of the pump 30 but provides for an operation of the blower 28 to sweep any unburned fuel particles from the combustion chamber 62 so that it is substantially clean of any residual fuel on a later starting of the heater.

Let it be assumed that only the combustion unit 21 is to be operated, it being understood that the operation of both units 19 and 21 is the same. To direct the supply of air to the unit 21 the valve 43 is moved to its position indicated in Fig. 3, while the fuel valve 46 is set by rotating its corresponding control knob 54 (Fig. 6) until the pointer 126 thereon is at the marking "1." The adjustment of rheostat 119 by the control knob 127 to an adjusted position will be explained later. As shown in Fig. 6, a control knob 124 for the switch 103 is rotated until the pointer 123 thereon is at the indicia "1" marked on the housing 26. In the operation of only the unit 19 the pointer 123 on the switch control knob 124 is moved opposite the indicia "2." When both of the units are to be operated the pointer 123 is moved opposite the indication "A." With the pointer 123 pointing to the marking "1," the switch 112 is snapped to its "start" position as indicated in Fig. 6.

On closing of the switch 103 by the control knob 124 the coil 97 is energized while closing of the switch 112 introduces air into the conditioning means 77 and in turn the combustion chamber 62 for the purpose above explained. After the conditioning means has been heated to a substantially fuel vaporizing temperature by the coil 97 the switch 112 is moved to its "run" position to provide for the supply of both air and fuel to the conditioning means 77. On the starting of combustion the switch 103 is moved to its open position indicated as "off" in Fig. 6 to de-energize the coil 97, the switch 112 being retained in a "run" position. By virtue of the heat from the combustion chamber 62 being transferred to the conditioning means 77, the conditioning means is retained at a fuel vaporizing temperature so as to continue to thoroughly mix the air and fuel supplied thereto. The coil 97, therefore, is energized only long enough to start combustion so that only the pump and motor are operated during a normal operation of the heater.

When the battery 25 has a pressure of twenty-four volts the starting current demand thereon for one commercial embodiment of the invention is about fourteen amperes. After burning has been initiated and the coil 97 cut out, the current demand or drain on the battery is reduced to less than two amperes, and varies between .625 and 1.625 amperes due to the current surges created in the operating circuit by the cutting in and out of the pump 30 by the circuit breaker 31. It is seen, therefore, that the motor 27 draws about .625 ampere, the pump about one ampere for each make of the circuit breaker 31, and the coil 97 about eleven amperes. The current drain of .625 ampere for the motor operates the blower 28 at about 4800 R. P. M. with a discharge capacity of about twenty cubic feet per minute. The blower creates a pressure in the air supply chamber 71 of about 2" of water. Since this air pressure alone acts on the combustion chamber burning takes place therein at substantially atmospheric pressure.

As mentioned above, the pump 30 draws about one ampere for each make of the circuit breaker 31. This make occurs at the rate of about thirty times a minute and has a duration of about one-tenth of a second. Because of this intermittent operation of the pump 30 its average steady current demand on the battery is only about .05 ampere and not one ampere. Since the motor demand is .625 ampere it is seen that the average continuous drain on the battery 25 during normal heater operation, that is after combustion has been initially started, is only .675 ampere. When used with a battery having, for example, a rating of two hundred ampere-hours the heater, when operating with one combustion unit 19 or 21, is capable of being efficiently and continuously operated for about three hundred hours. Also because of this low current demand a greater amount of the battery charge is recovered from the battery than when a relatively heavy current drain is imposed thereon. The battery charge, therefore, is utilized to its fullest extent so that continuous heater operation from a single battery is greatly increased. Further, for relatively short periods of heater operation, such as ten or twelve hours, the effective capacity of the battery is only slightly reduced so as not to interfere with its ability to later satisfactorily handle high current loads.

In the operation of single combustion unit 19 or 21 with the power demand as previously noted, there is generated a rated heat output of about 13,000 B. t. u. (British thermal units) per hour. With an average amperage drain of .675 ampere for the motor 27 and pump 30 at a pressure of 24 volts the battery power expended is about 16.2 watts. Assuming this power to be continued for one hour, during which time the heater generates 13,000 B. t. u., it is seen that the heater produces about 800 B. t. u. per watt-hour. Thus a large amount of heat is obtained from a very small amount of electrical energy so that apart from the heater being capable of a prolonged and continuous operation, it is capable also of a high heat output so as to provide for its application to a wide and varied number of uses.

The B. t. u. rating of a combustion unit 19 and 21 as given above is independent of the heat which might be obtained from the exhaust gases. It is obvious, of course, that such exhaust gases may be used directly for heating purposes, as by being discharged directly into the engine or battery compartment, or where this procedure might be objectionable by passing the exhaust gases through a suitable heat exchanger prior to their being discharged from the space to be heated. A full use of all of the heat produced by a combustion unit can thus be made, whereby to further increase the amount of available heat for heating purposes without additionally increasing the current drain of the heater on the battery. By considering both the heat radiated from a combustion unit and the heat in the exhaust gases thereof, there would be obtained a heat rating of B. t. u.'s per watt-hour appreciably larger than the rating of 800 B. t. u.'s per watt-hour which was determined on the basis of the heat radiated from a combustion chamber alone. The rating of a combustion unit 19 or 21 on the basis of the number of B. t. u.'s per watt-hour is substantially the same when it is operated at six or twelve volts, rather than twenty-four volts. Thus although the current demand for the motor 27 increases with a decrease in the battery voltage, the power required for operating the heater remains practically the same as does also the heat output of a combustion unit.

In the embodiment of the invention above noted the total combined weight of a control unit 15 and a combustion unit 19 or 21 is about fifteen pounds, so that the heater can be readily carried about to furnish heat wherever it may be wanted. At this weight the combustion chamber 62 has a length of about 12″ and a diameter of about 5″. By virtue of its small and compact size the combustion chamber 62 is readily located directly into relatively small spaces to be heated, such as the engine compartment 22 or the battery compartment 24. Thus for heating purposes, it is unnecessary for the entire heating unit to be located in the space to be heated, since the control unit 15 may be located either adjacent to, or remotely from, a corresponding combustion unit. Since the fuel is vaporized by heat for mixing together with the air, it is readily apparent that the supply of air and fuel to a combustion unit may be made regardless of the temperatures under which the heater is operating, due to the fact that the mixture to be burned is prepared directly at a corresponding combustion unit. The compact structure of the combustion chamber 62 provides for its being supported anywhere about the car engine such as for example, adjacent the crank case, the air intake manifold, or the carburetor, while also acting to heat the entire compartment.

As has been explained the average continuous drain of the heater on the battery 25 when a single combustion unit 19 or 21 is being operated is about .675 ampere. For an operation of both of the combustion units 19 and 21 the amperage drain on the battery increases to about 1.25 amperes, the current during normal operation varying between 1.25 and 2.25 amperes, due to the pump surges in the operating circuit. It is seen, therefore, that the motor 27 operates with 1.25 amperes, while the pump 30 draws the same amount of current as it did for the operation of a single combustion unit. The increase in amperage drain of the motor 27 is due to the additional air delivered by the blower 28, by virtue of the double discharge outlet. However, since both units are being operated, the heat output of the system is approximately doubled so that the B. t. u. output per watt-hour remains substantially the same as when a single unit is operated.

Each of the control units 19 and 21 has the flexible air and fuel supply lines corresponding thereto detachable relative to the control box 15 so that when not in operation the combustion units and their corresponding conduit lines may be easily packed for carrying in suitable apparatus compartments in the mobile craft. When it is desired to utilize these combustion units, it is only necessary to connect their corresponding conduit lines with the control box 15, with the flexibility of the conduit lines providing for the location of the combustion units anywhere about the vehicle.

Thus far in the description of the operation of the heating system of this invention the air and fuel for a combustion unit 19 or 21 have been explained as being selectively directed to the combustion units by the air valve 43, and the fuel valve 46. As to the air, the total discharge or capacity of the fan 28 is supplied to one unit or divided therebetween depending upon the setting of the valve 43. However, the total discharge of the pump to one combustion unit, because of the reduced discharge capacity of the blower 28 when a single combustion unit is operated, would result in a too rich mixture for efficient burning. To assure an efficient operation of the combustion units 19 and 21 whether operated singly or together, the pump circuit includes the rheostat 119, referred to in connection with the description of Fig. 11, which is carried on the inside of the housing 26 for the control unit 15 and has a control knob 127 (Figs. 2 and 6) on the outside of the housing 26. When only one unit 19 or 21 is being operated the knob 127 is rotated so that the pointer 128 thereon is opposite the indicia "1" marked on the housing 26. This rotation of the rheostat knob 127 increases the resistance in the pump circuit and decreases the pump discharge capacity in a manner now to be explained.

The pump 30 (Fig. 4) includes a cylinder 129 of tubular form which is operatively associated with a tubular piston 131 of elongated construction. The cylinder 129 is composed of a suitable nonmagnetic material such as die-cast material, or brass, while the piston is composed of a magnetic material such as iron. The piston is moved in one direction on energization of a solenoid 132 which is mounted about the cylinder 129, the piston 131 operating as a solenoidal core. Fluid enters the pump at the cylinder end 132 and is discharged therefrom at the cylinder end 133, the piston being movable between these ends of the cylinder. The flow of fuel through the cylinder ends 132 and 133 is controlled by valve structures 134 and 136, respectively, while the fuel flow through the tubular piston 131 is regulated by a valve structure 137 carried in one end thereof. All of the valve structures are of a substantially similar construction, with each thereof having a corresponding disc member 139, all of which are lifted in the same direction from an associated seat 141 in response to the fuel pressures acting thereon.

In the operation of the pump the piston 131 is moved in one direction, namely, to the left, as viewed in Fig. 4, by the magnetic action of the solenoid 132. The return movement of the piston 131 towards the right, is obtained by a spring 142 which is located in an expansible chamber 143 formed between the valve structures 134 and 137. The energization of the solenoid 132 is controlled by the action of the breaker assembly 31. On movement of the piston 131 to the left, the chamber 143 is contracted to increase the pressure of the fuel in such chamber. This increased pressure in the chamber 143 seats the disc 139 of the valve assembly 134 to prevent any flow of fuel outwardly through the pump inlet, and lifts the disc 139 of the valve assembly 137 to permit fuel from the chamber 143 to flow through the tubular piston 131 into an expansible outlet chamber 144 formed at the cylinder end 133 as indicated by the dotted line 146. On deenergization of the solenoid 132 the piston 131 is moved towards the right, as viewed in Fig. 4, by the spring 142. This movement of the piston decreases the pressure in the inlet chamber 143, due to its being expanded, whereby the valve structure 134 is opened to permit fuel to flow into the inlet chamber 143. The fuel in the outlet chamber 144 is compressed due to such chamber being contracted, with the increase in pressure closing the valve structure 137 and opening the valve structure 136 to discharge the fuel from the pump. On reenergization of the solenoid this cycle of operation is repeated.

As shown in Fig. 4 the piston 131 is in a fuel discharge position. On energization of the solenoid 132 the extent of movement of the piston 131 toward the left against the pressure of the spring 142 is dependent upon the intensity of the magnetic flux created by the solenoid 132 for acting on the piston. By virtue of the rheostat 119 the resistance in the pump circuit may be varied so as to change the current flow through the solenoid 132 and in turn vary the intensity of the magnetic flux created thereby. Thus by increasing the resistance in the pump circuit the magnetic flux is reduced which in turn weakens the magnetic pull of the solenoid acting to move the piston 131 against the spring 142. As a result the piston 131 is moved against the spring a distance less than its full working stroke so that the discharge of the pump is reduced in direct proportion to the reduction in the effective working stroke of the piston. With the rheostat control knob 127 at the position indicated in Fig. 6 the working stroke of the piston 131 is reduced, by a reduced current flow through the solenoid 132, so that a proper rate of fuel discharge from the pump 30 is provided for the operation of a single combustion unit 19 or 21. Since the fuel valve 46 determines to which combustion unit the fuel is to be supplied, the position of the rheostat pointer 128 opposite the marking "1" will operate the pump 30 for either combustion unit 19 or 21. It is to be understood of course that the marking "1" for the rheostat knob 127 may be only an approximate adjustment of the rheostat 119, and that the rheostat may be adjusted away from this position, after operation of the combustion unit has been started, to provide an optimum air and fuel mixture for burning. Similarly the marking "A" for the pointer 128 may be only an approximate setting of the rheostat when both units 19 and 21 are to be operated and, after combustion has been started, adjustment may be made to either side of this marking. By virtue of this rheostat control of the solenoid pump 30, therefore, a single pump is used to supply fuel to a plurality of combustion units, with the amount of fuel pumped being variable over a wide range by the simple adjustment of the rheostat knob 127.

In the operation of the combustion units 19 and 21 it may sometimes happen that raw fuel will be in the conditioning means 77 or combustion chamber 62 when a unit is first started, or possibly at times during its operation. It is apparent, of course, that any excess of fuel in the conditioning means 77 and also in the combustion chamber 62, may result in an erratic and uneven burning of the air and fuel mixture. To provide for an even burning of all of the air and fuel supplied to the heater, there is provided at the outlet end 82 of the conditioning means 77 an annularly extended rim portion 151 composed of a suitable foraminous ceramic material extended within the open end portion 82 but spaced from the insulating plate 93. Because of the foraminous construction of the ceramic member 151 any excess of fuel is absorbed therein and is given off gradually thereby so as to be progressively burned. To facilitate the burning of any raw fuel which might accumulate in the combustion chamber 62 strips 152 of the composition and construction of the member 151 are fitted in the inner open ends of the fins 84 immediately adjacent the combustion passage 72a. These strips 152 thus absorb any fuel accumulated in the combustion passage 72a and function to vaporize and ignite such fuel for burning.

From the above description, therefore, it is seen that the invention provides a battery-operated heater of internal combustion type which is adapted for either portable or stationary use, and which although light in weight and very compact in size has a relatively high heat output for a low power demand on the battery. As a result of this low power drain its continuous operation from a single battery over a prolonged period of time is positively assured regardless of any reduction in the effective capacity of the battery which might occur due to cold temperature conditions. A heater of this construction is particularly applicable as stand-by heating equipment for large transport trucks, army trucks, passenger buses, and for army tanks the equipment of which must be maintained at working temperatures regardless of weather conditions. Although the amperage drain of the electrical portions is very low, sufficient air and fuel is supplied thereby to operate a plurality of combustion units so that more than one space can be heated at the same time without unduly increasing the load on the battery. A single control box is provided whether a single or a plural number of combustion units are used, with the control means thereon being readily manipulated to change the operation of the units to any number desired.

Although the present invention has been described with reference to a preferred embodiment thereof it is to be understood that it is not to be so limited and that modifications and alterations can be made therein which are within the full intended scope of this invention as defined by the appended claims.

I claim:

1. In a heating system for a mobile craft having a dash board, control apparatus including air and fuel supply apparatus supported on said dash board to the operator's side thereof, a heat generating and radiating unit located to the engine side of said dash board and movable relative to said dash board to a plurality of heating positions, and flexible conduit means connecting said air and fuel supply apparatus with said unit.

2. For a mobile craft having a passenger space, an engine and a starting battery therefor, with said engine and battery having corresponding compartments and said battery having a reduced effective capacity at cold temperatures, a heating system of internal combustion type capable of being operated from said battery at cold temperatures to retain said engine and battery heated for engine starting purposes, said system including in combination an air and fuel supply unit with electrically operated air and fuel moving means therein, said supply unit being located in said passenger space, a combustion unit in each of said compartments, and conduit means connecting said supply unit with each of said combustion units, with the heat generated within a combustion unit being radiated into a corresponding compartment to heat the same.

3. In electrically operated heating apparatus of internal combustion type the combination of a control unit including electrical air and fuel supply means, a plurality of remotely located combustion units for generating heat, means for selectively delivering air and fuel from said control unit to any one or all of said combustion units, a circuit for said fuel supply means, and means in said circuit adjustable to vary the rate of fuel discharge from said fuel supply means in accordance with the number of combustion units being operated.

4. In a heating system which includes a pair of heating units each provided with a combustion chamber and a fuel conditioning unit for delivering a mixture of fuel and air to the associated combustion chamber; the combination which includes a control unit remotely located from said heating units and including air moving means and a fuel pump, conduit means interconnecting said control unit and said heater units, and means including said conduit means and valve means in said control unit for selectively delivering fuel from said pump and air from said air moving means to either or both of said fuel conditioning units.

5. In a heating system which includes a pair of heating units each provided with a combustion chamber and a fuel conditioning unit for delivering a mixture of fuel and air to the associated combustion chamber; the combination which includes a control unit remotely located from said heating units and including air moving means and a fuel pump, conduit means interconnecting said control unit and said heater units, means including said conduit means and valve means in said control unit for selectively delivering fuel from said pump and air from said air moving means to either or both of said fuel conditioning units, and means in said control unit for controlling said pump to vary the fuel delivery rate thereof so that the proper combustible mixture is delivered to said combustion chambers regardless of whether one or both of said heating units are operating.

6. In a heating system which includes a battery and a pair of heating units each provided with a combustion chamber and a fuel conditioning unit for delivering a mixture of fuel and air to the associated combustion chamber, and wherein each conditioning unit includes a fuel ignition element adapted for energization from said battery; the combination which includes a control unit remotely located from said heating units and including an electrically operated pump and electrically operated air moving means connected for energization from said battery, a conduit system interconnecting said control unit and said heater units, means including said conduit system for selectively delivering fuel from said pump and air from said air moving means to either or both of said fuel conditioning units, and means included in said control unit for selectively energizing either or both of said ignition elements from said battery.

7. In a heating system which includes a battery and a pair of heating units each provided with a combustion chamber and a fuel conditioning unit for delivering a mixture of fuel and air to the associated combustion chamber, and wherein each conditioning unit includes a fuel ignition element adapted for energization from said battery; the combination which includes a control unit remotely located from said heating units and including an electrically operated pump and electrically operated air moving means connected for energization from said battery, a conduit system interconnecting said control unit and said heater units, means including said conduit system for selectively delivering fuel from said pump and air from said air moving means to either or both of said fuel conditioning units, means included in said control unit for selectively energizing either or both of said ignition elements from said battery, and means included in said control unit for selectively controlling the energization of said pump to vary the fuel delivery rate thereof so that the proper combustible mixture is delivered to said combustion chambers regardless of whether one or both of said heating units are operating.

8. In apparatus having a plurality of compartments, combustion units included in at least two of said compartments, a supply unit in one of said compartments and including electrically operated air and fuel moving means therein, conduit means connecting the air and fuel moving means of said supply unit with each of said combustion units, and means included in said supply unit for selectively delivering fuel and air from said air and fuel moving means through said conduit means to any one or all of said combustion units.

9. In apparatus having a plurality of compartments, combustion units included in at least two of said compartments, a supply unit in one of said compartments and including electrically operated air and fuel moving means therein, conduit means connecting the air and fuel moving means of said supply unit with each of said combustion units, means included in said supply unit for selectively delivering fuel and air from said air and fuel moving means through said conduit means to any one or all of said combustion units, and means included in said supply unit for selectively controlling the operation of said fuel moving means to vary the fuel delivery rate thereof so that the proper combustible mixture is delivered to said combustion units regardless of the number of combustion units in operation.

10. In an installation having a plurality of compartments including an engine compartment and an operator's compartment, combustion units included in at least two of said compartments, a supply unit provided in said operator's compartment and including electrically operated fuel and air moving means therein, conduit means connecting the air and fuel moving means of said supply unit with each of said combustion units, and means included in said supply unit for selectively delivering fuel and air from said fuel and air moving means through said conduit means to any or all of said combustion units.

11. In an installation having a plurality of compartments including an engine compartment and an operator's compartment, combustion units included in at least two of said compartments, a supply unit provided in said operator's compartment and including electrically operated fuel and air moving means therein, conduit means connecting the air and fuel moving means of said supply unit with each of said combustion units, means included in said supply unit for selectively delivering fuel and air from said fuel and air moving means through said conduit means to any or all of said combustion units, and means included in said supply unit for selectively controlling the operation of said fuel moving means to vary the fuel delivery rate thereof so that the proper combustible mixture is delivered to said combustion units regardless of the number of combustion units in operation.

12. In an installation having an engine compartment, an operator's compartment and a battery compartment, combustion units included in said engine and battery compartments, a supply unit provided in said operator's compartment and including electrically operated fuel and air moving means therein, conduit means connecting the fuel and air moving means of said supply unit with each of said combustion units, and manually operable valve means included in said supply unit for selectively delivering fuel and air from said fuel and air moving means through said conduit means to either or both of said combustion units.

13. In an installation having an engine compartment, an operator's compartment and a battery compartment, combustion units included in said engine and battery compartments, a supply unit provided in said operator's compartment and including electrically operated fuel and air moving means therein, conduit means connecting the fuel and air moving means of said supply unit with each of said combustion units, manually operable valve means included in said supply unit for selectively delivering fuel and air from said fuel and air moving means through said conduit means to either or both of said combustion units, and means included in said supply unit for selectively controlling the operation of said fuel moving means to vary the rate of fuel delivery thereof so that the proper combustible mixture is delivered to said combustion units regardless of whether one or both of said combustion units are operating.

14. In an installation having a plurality of compartments including an engine compartment and an operator's compartment, combustion units included in at least two of said compartments and each provided with a combustion chamber and a fuel and air mixing unit for delivering a mixture of fuel and air to the associated combustion chamber, a fuel ignition element included in each combustion unit, a supply unit provided in said operator's compartment and including an electrically operated motor driven pump and electrically operated air moving means, conduit means connecting said pump and said air moving means with said fuel and air mixing units, means included in said supply unit for selectively delivering fuel from said pump and air from said air moving means to any one or all of said air and fuel mixing units, and means included in said supply unit for selectively energizing any one or all of said ignition elements.

15. In an installation having a plurality of compartments including an engine compartment and an operator's compartment, combustion units included in at least two of said compartments and each provided with a combustion chamber and a fuel and air mixing unit for delivering a mixture of fuel and air to the associated combustion chamber, a fuel ignition element included in each combustion unit, a supply unit provided in said operator's compartment and including an electrically operated motor driven pump and electrically operated air moving means, conduit means connecting said pump and said air moving means with said fuel and air mixing units, means included in said supply unit for selectively delivering fuel from said pump and air from said air moving means to any one or all of said air and fuel mixing units, means included in said supply unit for selectively energizing any one or all of said ignition elements, and means included in said supply unit for selectively controlling the energization of the pump motor to vary the fuel delivery rate of the pump so that the proper combustible mixture is delivered to said combustion chambers regardless of the number of combustion units in operation.

HARRY B. HOLTHOUSE.